(12) United States Patent
Stephan et al.

(10) Patent No.: US 11,458,766 B1
(45) Date of Patent: *Oct. 4, 2022

(54) ADJUSTABLE PORTAL PLATE

(71) Applicant: Super ATV, LLC, Madison, IN (US)

(72) Inventors: Jordan E. Stephan, Hanover, IN (US); Justin L. Eaton, Hanover, IN (US)

(73) Assignee: Super ATV, LLC, Madison, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/805,745

(22) Filed: Jun. 7, 2022

Related U.S. Application Data

(63) Continuation of application No. 16/717,210, filed on Dec. 17, 2019, now Pat. No. 11,358,412.

(60) Provisional application No. 62/781,829, filed on Dec. 19, 2018.

(51) Int. Cl.
*B60B 35/00* (2006.01)
*B60K 17/04* (2006.01)
*B60B 35/12* (2006.01)
*B60B 35/16* (2006.01)

(52) U.S. Cl.
CPC .......... *B60B 35/001* (2013.01); *B60B 35/007* (2013.01); *B60B 35/122* (2013.01); *B60B 35/163* (2013.01); *B60K 17/043* (2013.01); *B60Y 2200/20* (2013.01)

(58) Field of Classification Search
CPC ... B60B 35/001; B60B 35/006; B60B 35/007; B60B 35/121; B60B 35/122; B60B 35/163
See application file for complete search history.

(56) References Cited

U.S. PATENT DOCUMENTS

| | | | | |
|---|---|---|---|---|
| 6,286,619 | B1* | 9/2001 | Uchiyama | B62K 5/01 |
| | | | | 180/351 |
| 10,479,156 | B2* | 11/2019 | Eaton | B60K 17/04 |
| 11,318,787 | B2* | 5/2022 | Stephan | B60B 25/006 |
| 11,358,412 | B2* | 6/2022 | Stephan | B60B 35/122 |
| 2004/0178014 | A1* | 9/2004 | Groves | B60K 17/043 |
| | | | | 180/337 |
| 2018/0094697 | A1* | 4/2018 | Shirley | F16H 57/025 |
| 2021/0023941 | A1* | 1/2021 | Stephan | F16H 57/022 |

* cited by examiner

*Primary Examiner* — Jason R Bellinger
(74) *Attorney, Agent, or Firm* — Woodard, Emhardt, Henry, Reeves & Wagner, LLP

(57) ABSTRACT

An adjustable portal box assembly for selectively mounting a wheel to an off road vehicle in either of two positions. The assembly includes a mounting plate mountable to the suspension of an off road vehicle, and a portal box is mountable to the mounting plate. The portal box includes an input shaft opening for an input shaft, and an output opening for an output shaft. The portal box is mountable to the mounting plate in a first position in which the output shaft is positioned to extend the wheelbase relative to the input shaft, or in a second position in which the output shaft is positioned in vertical alignment with the input shaft.

5 Claims, 15 Drawing Sheets

ADJUSTABLE PORTAL PLATE

REFERENCE TO RELATED APPLICATIONS

This application claims priority from U.S. patent application Ser. No. 16/717,210, filed Dec. 19, 2019, now issued as U.S. Pat. No. 11,358,412, which claims the benefit of U.S. Provisional Application No. 62/781,829, filed Dec. 19, 2018; the entire contents of both prior applications, and of related U.S. patent application Ser. No. 17/348,913, now issued as U.S. Pat. No. 11,318,787, being hereby incorporated herein by reference.

FIELD OF THE INVENTION

The present invention relates generally to portal wheel ends for lifting the wheels of an off road vehicle such as an all-terrain vehicle (ATV) or a utility task vehicle (UTV), and more particularly to a portal box and associated hardware end that provides wheel base extension in addition to lift.

BACKGROUND OF THE INVENTION

Portal boxes are known to ATV and UTV enthusiasts for providing increased ground clearance, or lift, and the low gearing needed for bigger tires. Such boxes are typically mounted to an ATV/UTV by first mounting a backing plate to the suspension of the vehicle, and by then mounting the portal box to the backing plate. U.S. Pat. No. 8,985,264 to Shirley is one example of such a device.

The backing plate of Shirley, and of the other portal box mounting systems known to the art, have the input shaft positioned directly above the output shaft. This provides the greatest degree of lift, while minimizing the torque on the mounting assembly.

Applicant has determined that alternative mounting options may provide benefits not provided by prior art assemblies. A need therefore exists for a mounting assembly for a portal box in which the box may be mounted to the mounting plate in an alternative position. The present invention addresses that need.

SUMMARY OF THE INVENTION

Briefly describing one aspect of the present invention, there is provided an adjustable portal box assembly for selectively mounting a wheel to an off road vehicle in either of two positions. The assembly includes a mounting plate mountable to the suspension of an off road vehicle, and a portal box is mountable to the mounting plate. The portal box includes an input shaft opening for an input shaft, and an output opening for an output shaft. The portal box is mountable to the mounting plate in a first position in which the output opening is positioned to extend the wheelbase relative to the input shaft opening, or in a second position in which the output opening is positioned in vertical alignment with the input shaft opening.

In another aspect of the present invention there is provided an adjustable portal box assembly for selectively mounting a wheel to an off road vehicle in a standard, lifted position, or in an extended, lifted position. The assembly comprises a mounting plate and a portal box, with the mounting plate being mountable to the suspension of an off road vehicle, and the portal box being mountable to the mounting plate. The portal box includes an input shaft opening for an input shaft, and an output opening for an output shaft, and is mountable to the mounting plate in either of two positions. In the first position the output opening is positioned below and forward of said input shaft opening when the assembly is adapted for mounting a forward wheel, and the output opening is positioned below and rearward of said input shaft opening when the assembly is adapted for mounting a rearward wheel. In the second position the output opening is positioned below and not forward of said input shaft opening when the assembly is adapted for mounting a forward wheel, and the output opening is positioned below and not rearward of said input shaft opening when the assembly is adapted for mounting a rearward wheel.

In another aspect of the present invention there is provided an adjustable portal box assembly for mounting a wheel to an off road vehicle in a lifted and extended wheelbase position. The assembly comprises a mounting plate and a portal box. The mounting plate is mountable to the suspension of an off road vehicle, and the portal box is mountable to said mounting plate. The portal box includes an input shaft opening for an input shaft, and an output opening for an output shaft. The portal box is mountable to the mounting plate in an extended wheelbase position in which the output opening is positioned below and forward of said input shaft opening when the assembly is adapted for mounting a forward wheel, and in which the output opening is positioned below and rearward of said input shaft opening when the assembly is adapted for mounting a rearward wheel.

In another aspect of the present invention there is provided an adjustable portal box assembly for selectively mounting a wheel to an off road vehicle in either of two positions. The assembly comprises a mounting plate, a portal box, and input shaft, and an output shaft. The mounting plate is mountable to the suspension of an off road vehicle, and the portal box is mountable to said mounting plate. The portal box includes an input shaft opening for receiving the input shaft, and an output opening for receiving the output shaft, and the input shaft is operably connected to the vehicle and extends into the portal box assembly through the input shaft opening, and the output shaft extends outward from the portal box assembly through said output opening. The portal box is mountable to the mounting plate in a first position in which the output shaft is positioned below and forward of said input shaft when the assembly is adapted for mounting a forward wheel, and below and rearward of said input shaft when the assembly is adapted for mounting a rearward wheel, and in a second position in which the output shaft is positioned below and in vertical alignment with said input shaft.

DESCRIPTION OF THE PREFERRED EMBODIMENTS

Figure 1:
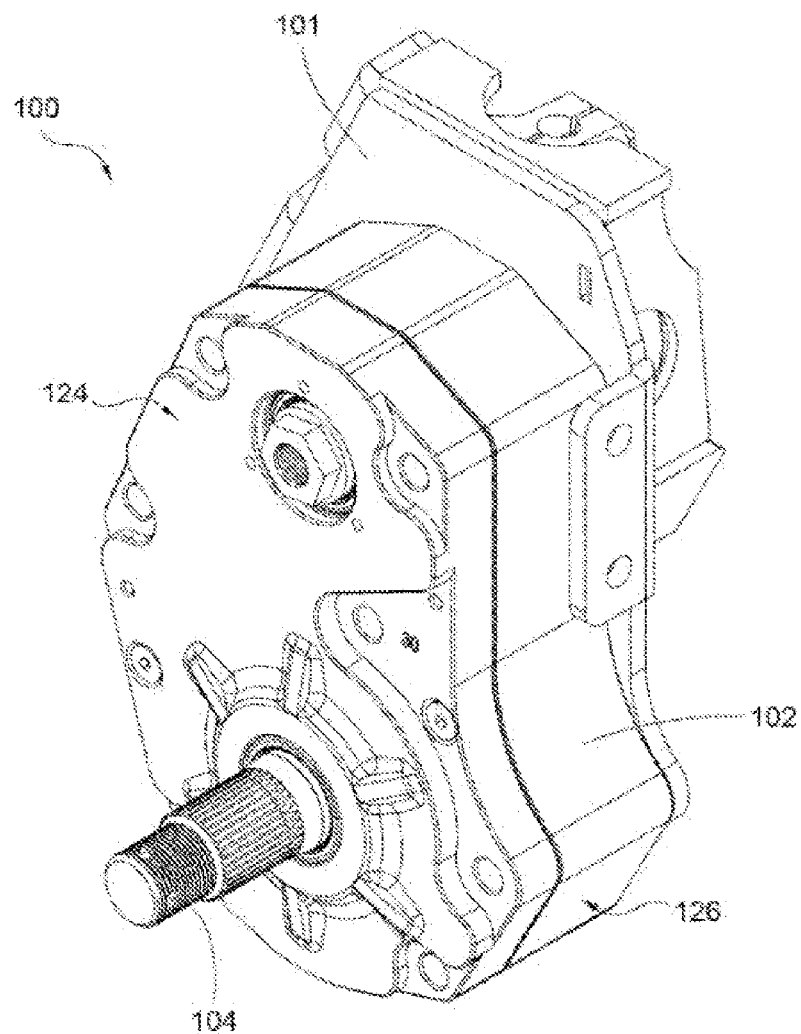
FIG. 1 is a front perspective view of a portal box assembly according to one embodiment of the present invention.

For the purposes of promoting an understanding of the principles of the invention, reference will now be made to certain embodiments and specific language will be used to describe the same. It will nevertheless be understood that no limitation of the scope of the invention is thereby intended, such alterations and further modifications in the described device, and such further applications of the principles of the invention as illustrated therein, being contemplated as would normally occur to one skilled in the art to which the invention relates.

As indicated above, one aspect of the present invention relates to an adjustable portal box assembly for selectively mounting a wheel to an off road vehicle in either of two positions. The inventive assembly comprises a mounting plate and a portal box. The mounting plate is mountable to the suspension of an off road vehicle, and the portal box is mounted to the mounting plate. As is known to the art, the portal box includes an input shaft opening for an input shaft, and an output opening for an output shaft. The portal box is mountable to the mounting plate in either of two positions, namely: 1) a position in which the output opening is positioned below and vertical alignment with the input shaft opening; and 2) a position in which the output opening is positioned below and forward of the input shaft opening when the assembly is adapted for mounting a forward wheel, or below and rearward of the input shaft opening when the assembly is adapted for mounting a rearward wheel, in both cases extending the wheelbase of the vehicle compared to the wheelbase when the output opening is in vertical alignment with the input shaft opening.

Each mounting plate is mountable to either a front wheel or a rear wheel, or optionally either. Similarly, each mounting plate is mountable to either a left wheel or a right wheel, or optionally either. Accordingly, each mounting plate may be a front left plate, or a front right plate, or a rear left plate, or a rear right plate, or a front plate that is usable on either the left or the right, or a rear plate that is usable on either the left or the right, or a left plate that is usable on either the front or the rear, or a right plate that is usable on either the front or the rear, or a universal plate that is usable on any wheel. Potentially other combinations are also available depending on the specifics of how the plate is to be mounted to the vehicle.

The mounting plate portion of the inventive portal box assembly includes an opening for receiving an input shaft. The input shaft is generally centered in the input shaft opening.

The portal box portion of the inventive portal box assembly includes an opening for extending an output shaft. The output shaft is generally centered in the output shaft opening.

In all embodiments of the present invention the mounting plate is adapted such that the portal box is mountable to the mounting plate in a position in which the output shaft is positioned below and forward of the input shaft when the assembly is adapted for mounting a front wheel, or below and rearward of the input shaft when the assembly is adapted for mounting a rear wheel. This "extended wheelbase" position extends the wheelbase of the vehicle compared to the wheelbase when the output shaft is in vertical alignment with the input shaft.

In some embodiments, the mounting plate is adapted such that the portal box is mountable to the mounting plate in either a "vertically aligned" or an "extended wheelbase" position. In the "vertically aligned" position the output shaft is positioned directly above the input shaft, and is not forward or rearward of the input shaft. The wheelbase of the vehicle is thus substantially the same as the wheelbase when the portal box is not installed. In the "extended wheelbase" position the output shaft is positioned below and forward of the input shaft when the assembly is adapted for mounting a front wheel, or below and rearward of the input shaft when the assembly is adapted for mounting a rear wheel. In both cases this extends the wheelbase of the vehicle compared to the wheelbase when the output shaft is in vertical alignment with the input shaft.

In some embodiments, the mounting plate is adapted such that the portal box is mountable to the mounting plate only in an "extended wheelbase" position in which the output shaft is positioned below and forward of the input shaft when the assembly is adapted for mounting a front wheel, or below and rearward of the input shaft when the assembly is adapted for mounting a rear wheel.

The mounting plate includes at least one set of holes for mounting the portal box to the mounting plate in its first position, and at least one set of holes for mounting the portal box to the mounting plate in its second position. In some embodiments the two sets of holes are the same, so that the portal box may be mounted to the mounting plate in either the "vertically aligned" or "extended wheelbase" second position. In other embodiments the portal box includes a first set of holes for mounting the portal box to the mounting plate in its "vertically aligned" position, and a second and different set of holes for mounting the portal box to the mounting plate in its "extended wheelbase" position.

The mounting plate includes hardware (e.g., mounting brackets) adapted to mount the assembly to the suspension of the off road vehicle, and for connecting components such as steering arms and the like. The mounting hardware may be separable from, or incorporated into, the mounting plate.

The portal box portion of the inventive assembly preferably includes a rear wall, side walls, and a front wall (cover), at least one of which is preferably removable to allow access to the inside of the box.

Holes for mounting the portal box to the mounting plate in either its first position or its second position are preferably included in the rear cover of the portal box, and the front cover may also include holes for mounting the portal box to the mounting plate in either its first position or its second position.

The portal box preferably includes gears for directly or indirectly transferring power from the input shaft to the output shaft. The gears also reduce the speed of rotation of the output shaft relative to the speed of rotation of the input shaft, thus providing the amount of gear reduction necessary to run larger tires. The gears typically include a first gear mounted directly or indirectly to the input shaft, and a second gear mounted directly or indirectly to the output shaft.

In another embodiment the adjustable portal box assembly is effective for mounting a wheel to an off road vehicle in a lifted and extended wheelbase position. That assembly also includes a mounting plate and a portal box, with the mounting plate being mountable to the suspension of an off road vehicle, and the portal box being mountable to said mounting plate. The portal box is mountable to the mounting plate in an extended wheelbase position in which the output opening is positioned below and forward of said input shaft opening when the assembly is adapted for mounting a forward wheel, and in which the output opening is positioned below and rearward of said input shaft opening when the assembly is adapted for mounting a rearward wheel. However, in this embodiment the portal box is not mountable to the mounting plate in a position in which the output opening is vertically aligned with the input shaft opening.

Referring now to the drawings, FIG. 1 is a front perspective view of a portal box assembly according to one embodiment of the present invention. Assembly 100 includes a mounting plate 101 and a portal box 102. Portal box 102 includes portal box side wall 126 and portal box cover 124. Output shaft 104 extends from portal box 102.

Figure 2:
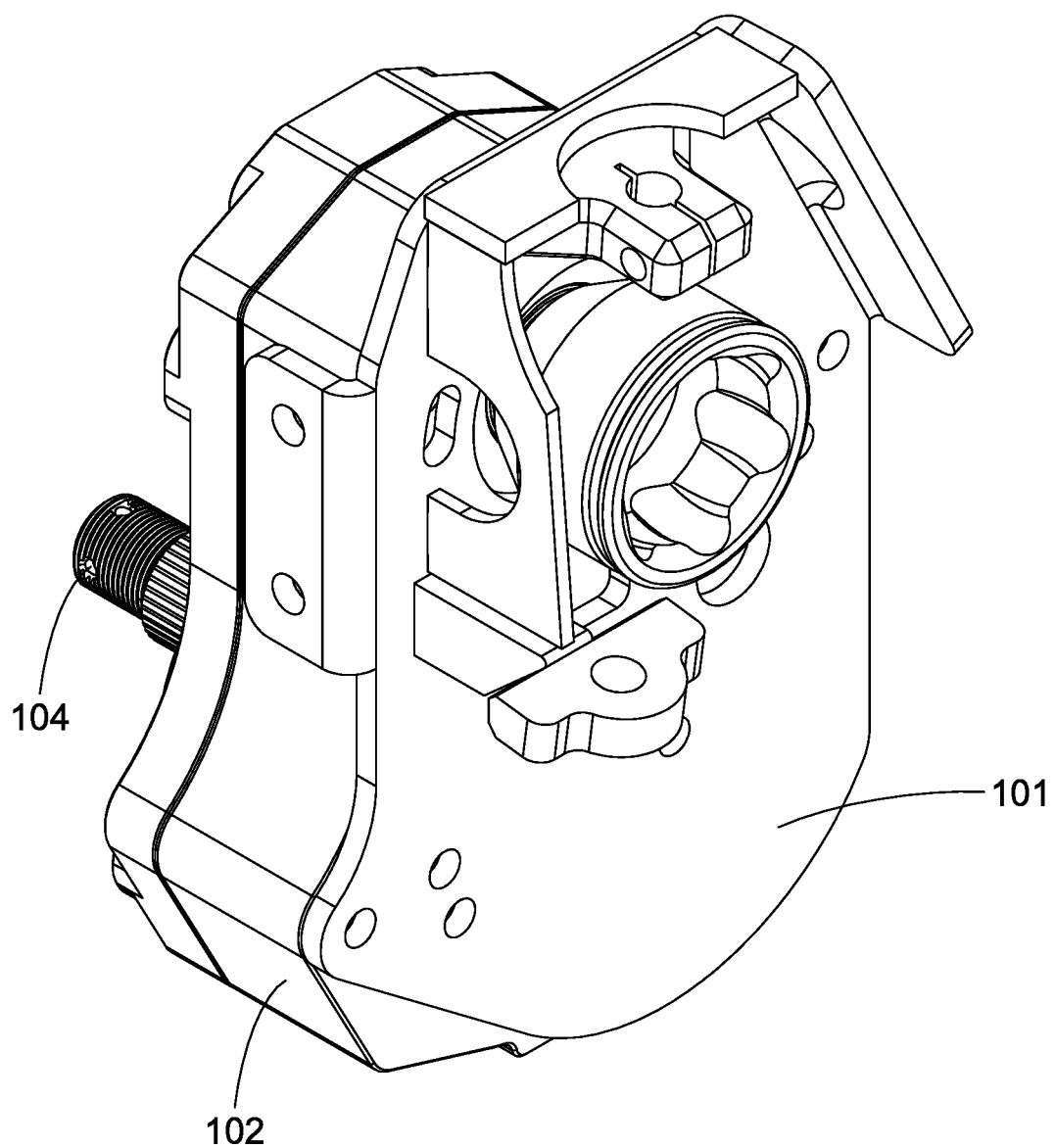
FIG. 2 is a rear perspective view of the portal box assembly of FIG. 1.

FIG. 2 is a rear perspective view of portions of the portal box assembly of FIG. 1. Portal box 120 includes portal box side wall 126, and output shaft 104 extends from the box. Input shaft gear 105 is connected to input shaft 103, and output shaft gear 106 is connected to output shaft 104. Linking gear 107 connects input shaft gear 105 to output shaft gear 106.

Figure 3:
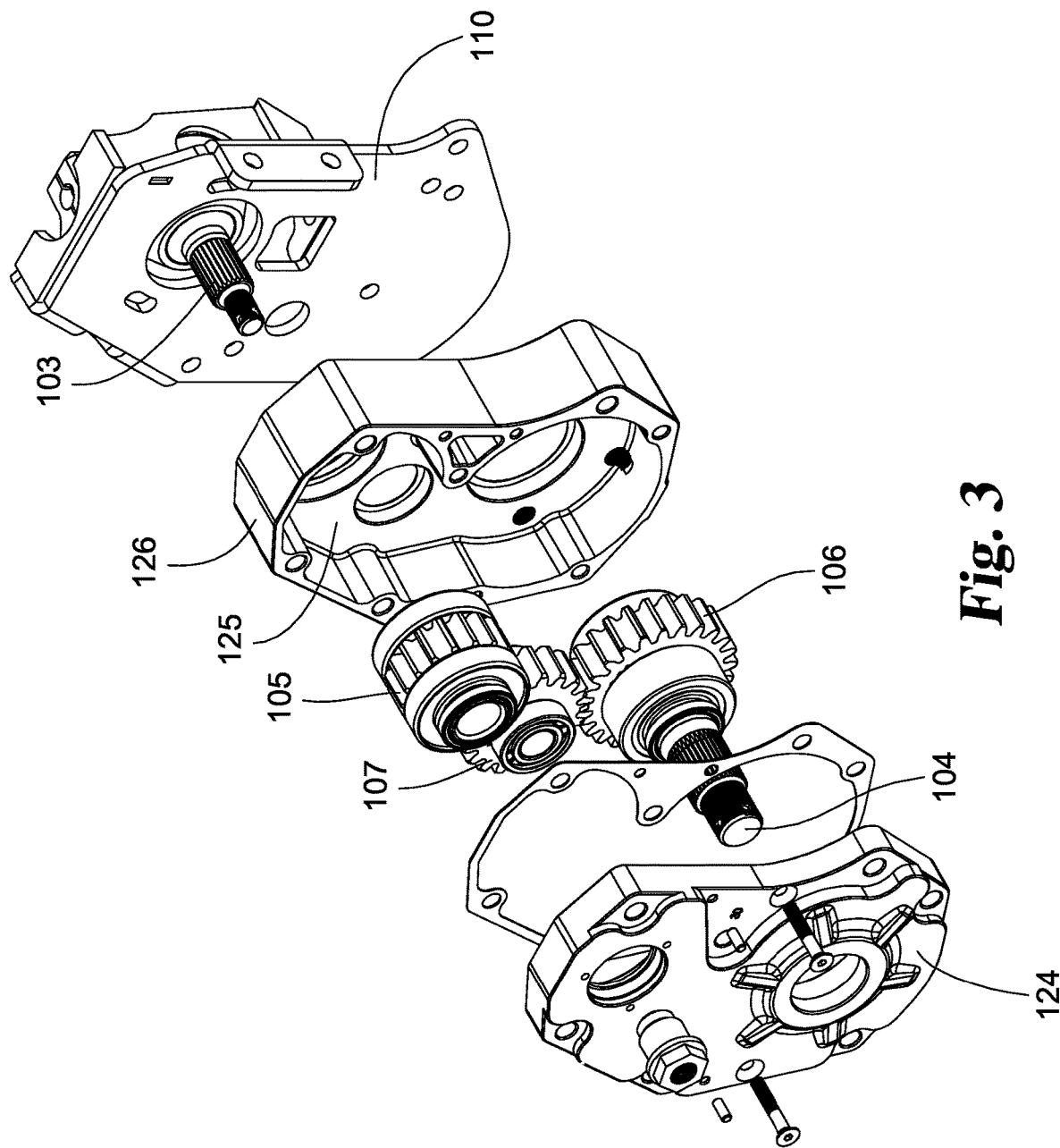
FIG. 3 is a front perspective view of the portal box assembly of FIG. 1 with the front portal box cover removed.

FIG. 3 is an exploded view of the portal box assembly of FIG. 1. Mounting plate 101 includes an input shaft opening, and input shaft 103 extends through that input shaft opening. Portal box 102 includes rear wall 125, side wall 126, and front cover 124. Output shaft opening 109 is provided in front cover 124 of portal box 102, and output shaft 104 extends through output shaft opening 109. Rear plate 110 facilitates mounting box 102 to a vehicle.

Figure 4:
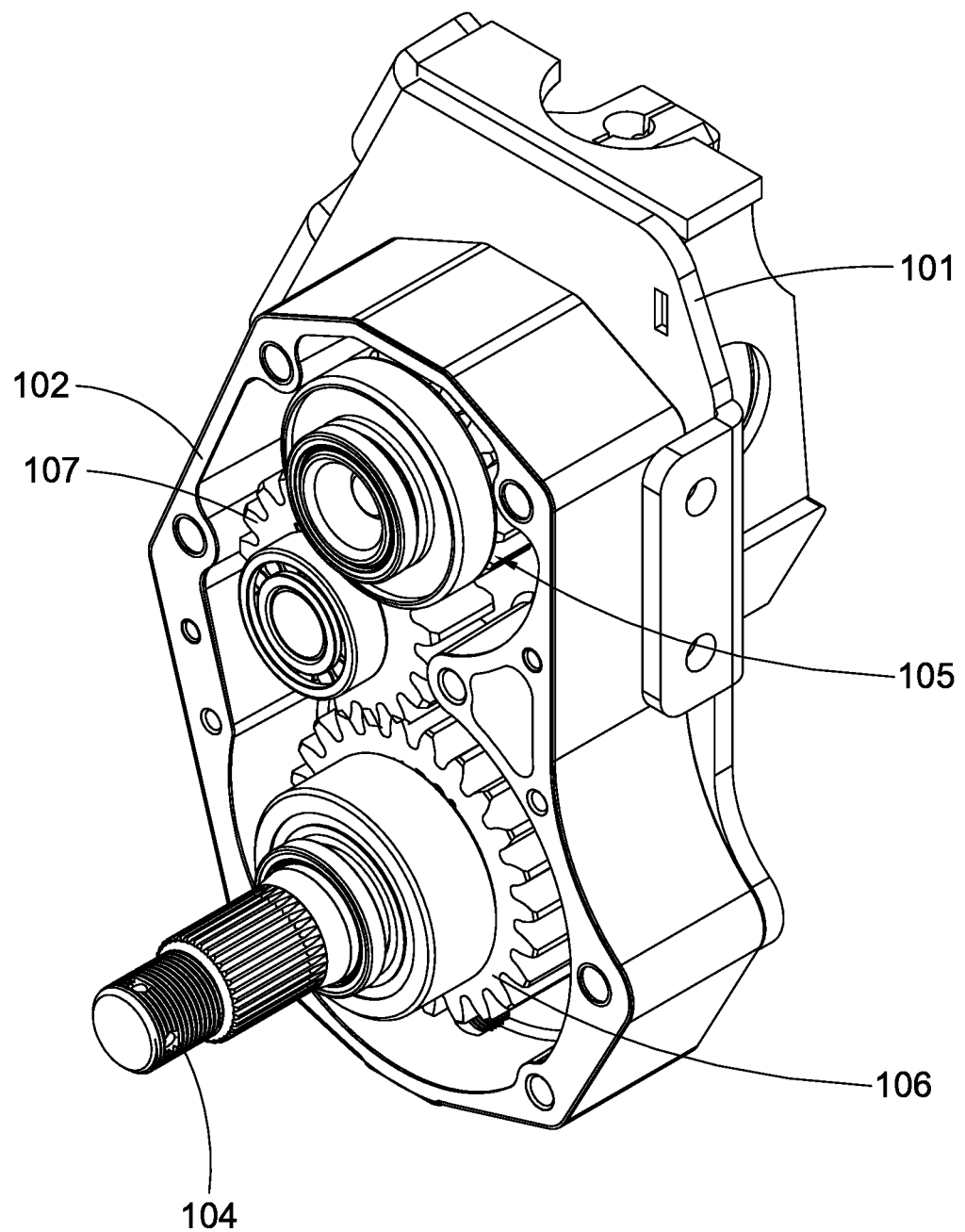
FIG. 4 is an exploded view of the portal box assembly of FIG. 1.

FIG. 4 is a front perspective view of the portal box assembly of FIG. 1 with the front portal box cover removed. Input shaft gear 105, linking gear 107, and output shaft gear 107 are visible when the cover is removed.

Figure 5:
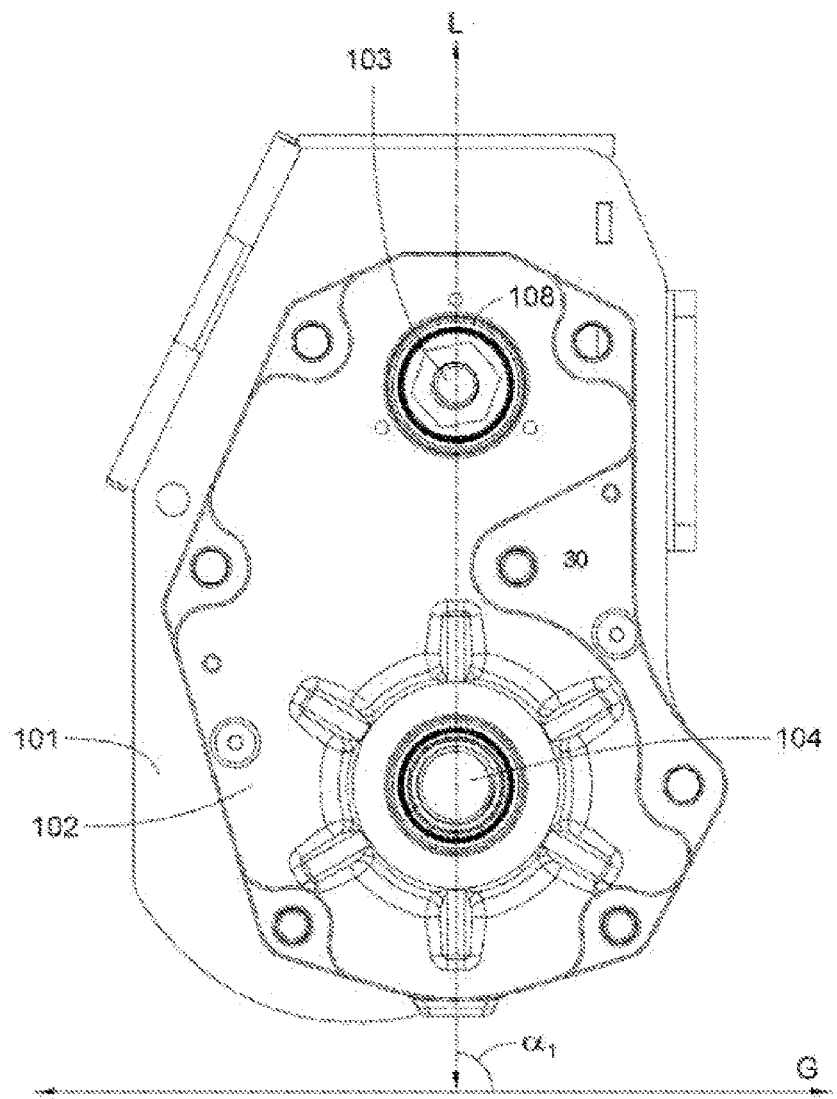
FIG. 5 is a front elevational view of the portal box assembly of FIG. 1, showing the box attached to the mounting plate in a position in which the output opening is positioned below and vertically aligned with the input shaft opening.

FIG. 5 is a front elevational view of the portal box assembly of FIG. 1, showing the box attached to the mounting plate in a position in which output opening 109 is positioned below and vertically aligned with the input shaft opening 108. While not shown in the drawing, input shaft 103 extends backward from, and perpendicular to, the plane of the page. Similarly, output shaft 104 extends forward from, and perpendicular to, the plane of the page. Line L passes through the center of input shaft 103 (and presumably through the center of input shaft opening 108) and the center of output shaft 104 (and presumably through the center of output shaft opening 109) when viewed from this perspective. Portal box 102 is mounted to mounting plate 101 such that output shaft 104 (and presumably output shaft opening 109) is vertically aligned with input shaft 103 (and presumably input shaft opening 108). When output shaft 104 is vertically aligned with input shaft 103, line L is substantially perpendicular to any line passing through the plane of the "ground" when the assembly is properly mounted to a vehicle resting on a flat, horizontal, planar surface. In FIG. 5, one such line is illustrated by line G, with the angle $\alpha^1$ between line L and line G being substantially 90°.

Figure 6:
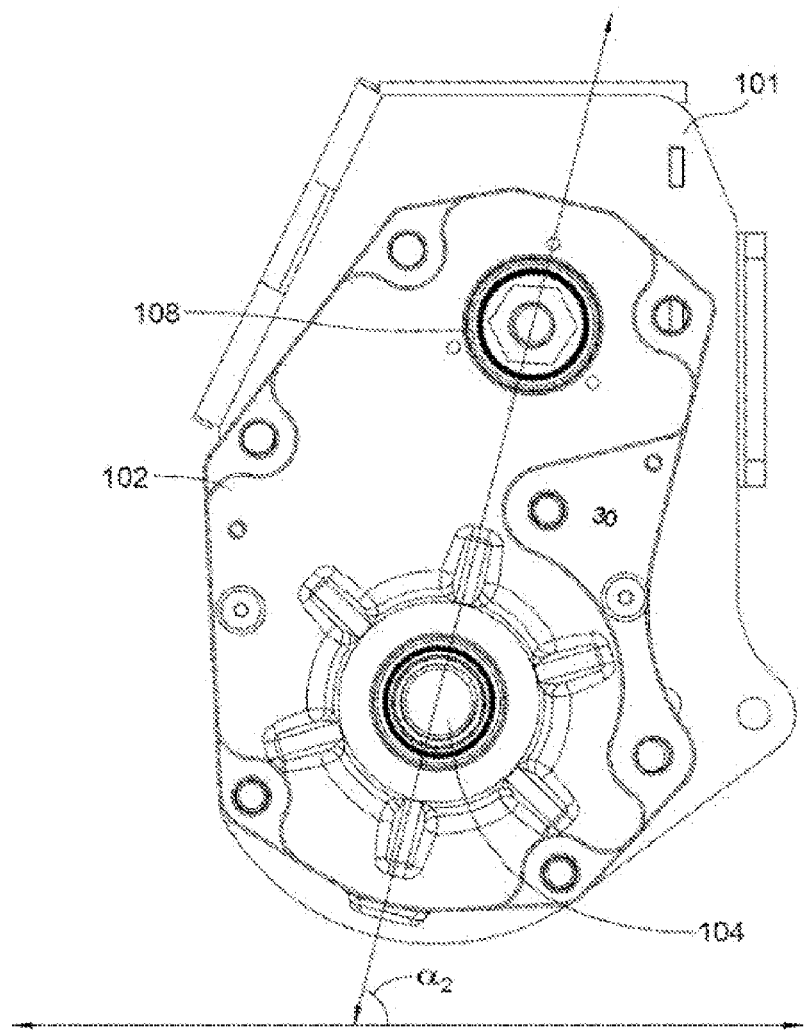
FIG. 6 is a front elevational view of the portal box assembly of FIG. 1, showing the box attached to the mounting plate in a position in which the output opening is positioned forward of the input shaft opening.

FIG. 6 is a front elevational view of the portal box assembly of FIG. 1, showing the box attached to the mounting plate in a position in which the output opening is positioned forward of the input shaft opening. In FIG. 6, portal box 102 is attached to mounting plate 101 in a position in which output opening 109 is positioned below and forward of input shaft opening 108 when the assembly is mounted to a front wheel. Here too, while not shown in the drawing, input shaft 103 extends backward from, and perpendicular to, the plane of the page, output shaft 104 extends forward from, and perpendicular to, the plane of the page, and line L passes through the center of input shaft 103 (and presumably through the center of input shaft opening 108) and the center of output shaft 104 (and presumably through the center of output shaft opening 109). In this case though, portal box 102 is mounted to mounting plate 101 such that output shaft 104 (and presumably output shaft opening 109) is not vertically aligned with input shaft 103 (and presumably input shaft opening 108). Instead, output shaft 104 is forward of input shaft 103, and line L is not substantially perpendicular to the plane of the "ground" when the assembly is properly mounted to a vehicle resting on a flat, horizontal, planar surface. In the illustrated embodiment, line L forms and angle $\alpha_2$ that is approximately 15° from perpendicular with respect to line G.

Figure 7:
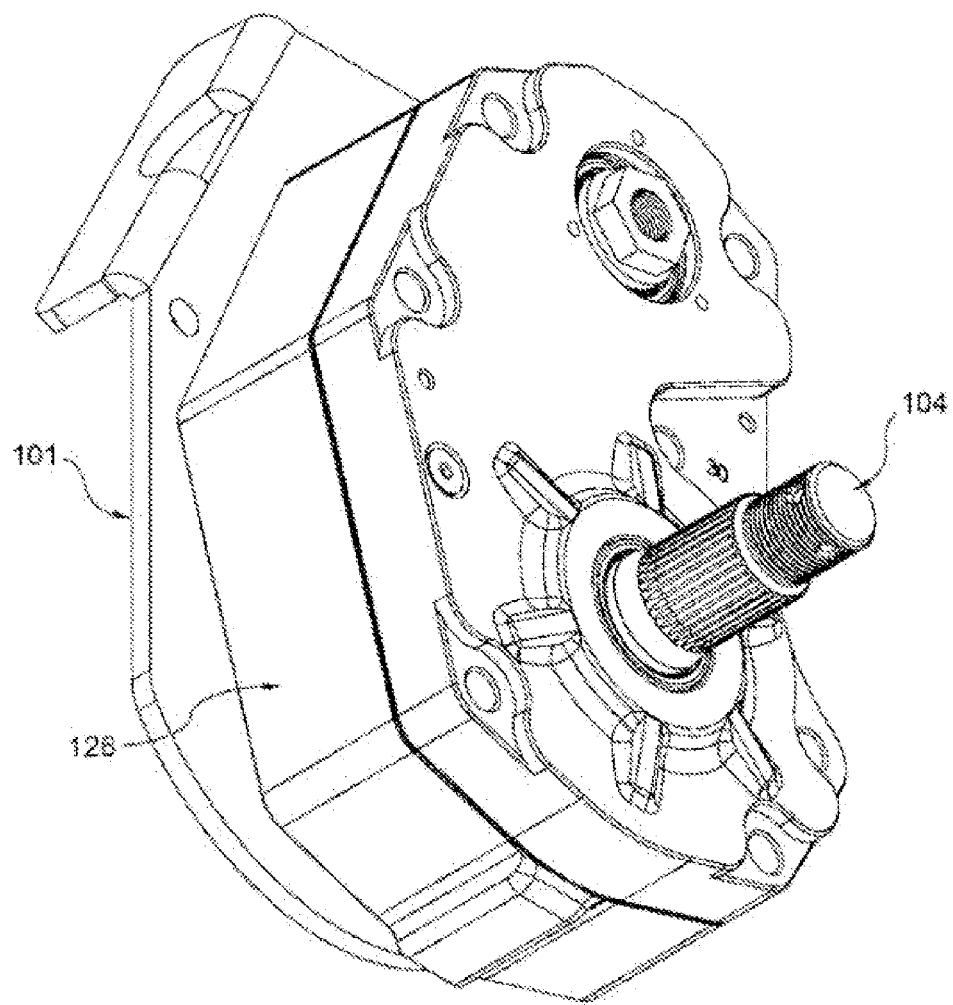
FIG. 7 is a perspective view of the portal box assembly of FIG. 1, showing the box attached to the mounting plate in a position in which the output shaft is vertically aligned with the input shaft.

FIG. 7 is a perspective view of the portal box assembly of FIG. 1, showing the box attached to the mounting plate in a position in which the output shaft is vertically aligned with the input shaft. At least one mounting hole for mounting the box to the mounting plate is visible to the left of the box because the box is positioned farther to the right than it is when the output shaft is forward of the input shaft.

Figure 8:
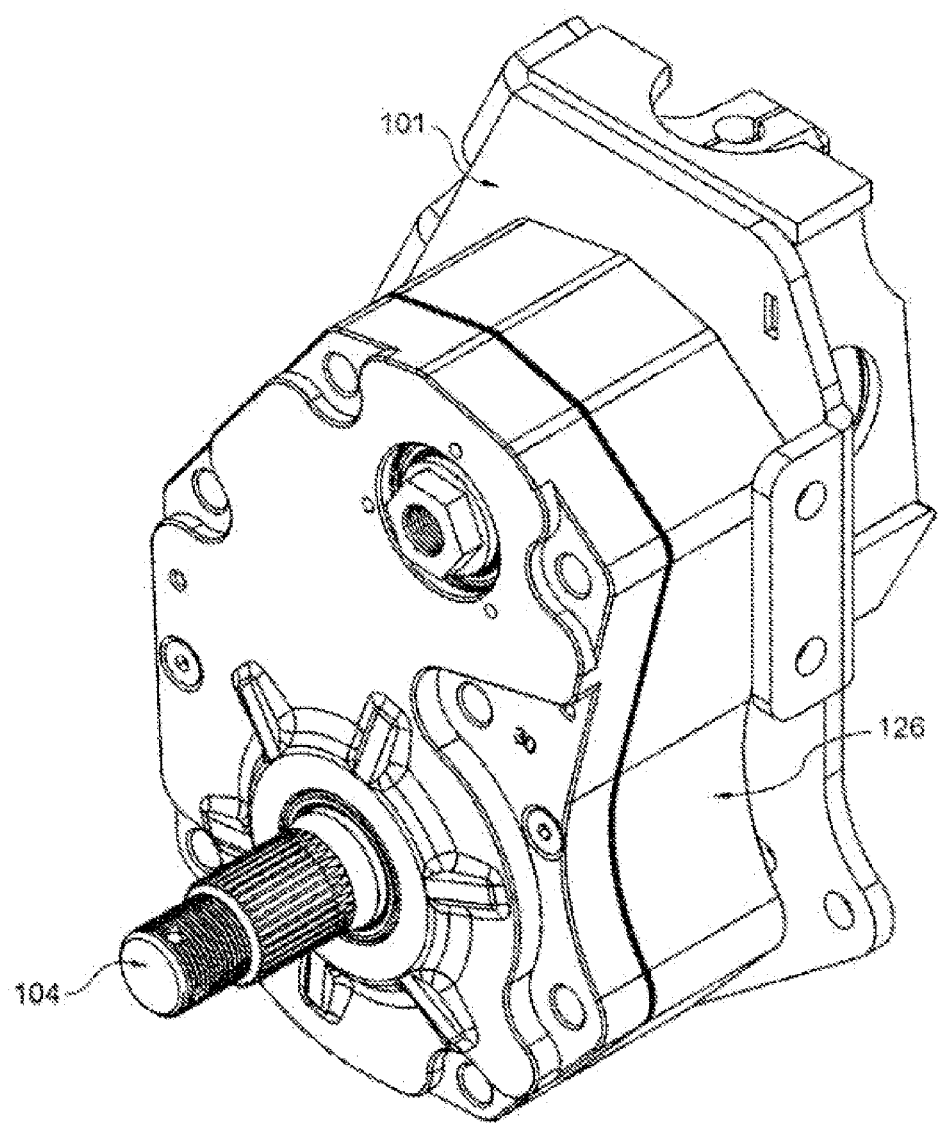
FIG. 8 is a perspective view of the portal box assembly of FIG. 1, showing the box attached to the mounting plate in a position in which the output shaft is forward of the input shaft.

FIG. 8 is a perspective view of the portal box assembly of FIG. 1, showing the box attached to the mounting plate in a position in which the output shaft is forward of the input shaft. At least one mounting hole for mounting the box to the mounting plate is visible to the right of the box because the box is positioned farther to the left than it is when the input shaft and the output shaft are vertically aligned.

Figure 9:
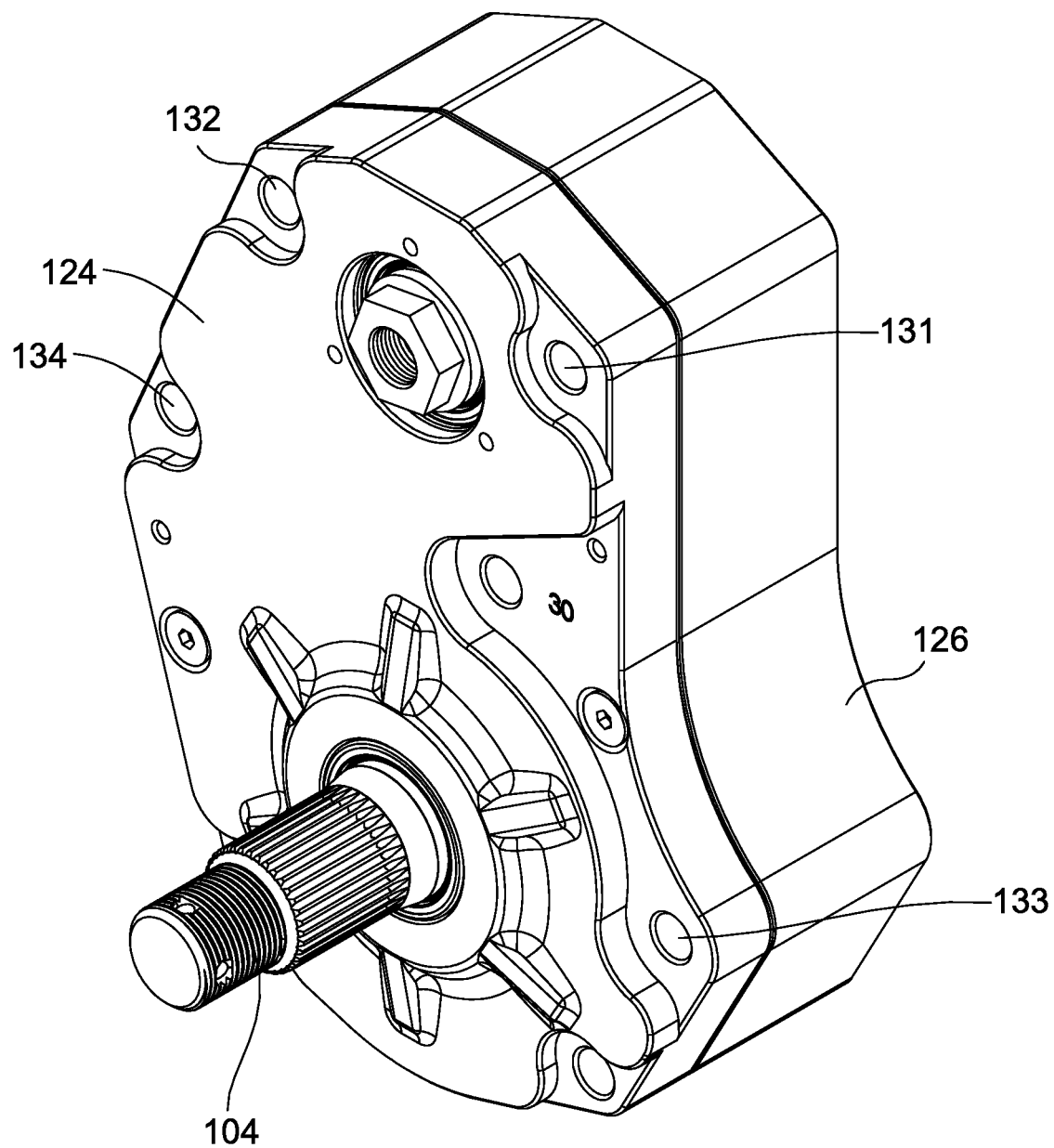
FIG. 9 is a front perspective view of the portal box portion of the portal box assembly of FIG. 1.

FIG. 9 is a front perspective view of the portal box portion of the portal box assembly of FIG. 1. An input shaft enters portal box 102 from the rear, and output shaft 104 extends from the front of portal box 102. Holes 131, 132, 133, and 134 for mounting the cover to the body of the portal box, and for mounting the portal box to the mounting plate, are visible in the front cover of the box.

Figure 10:
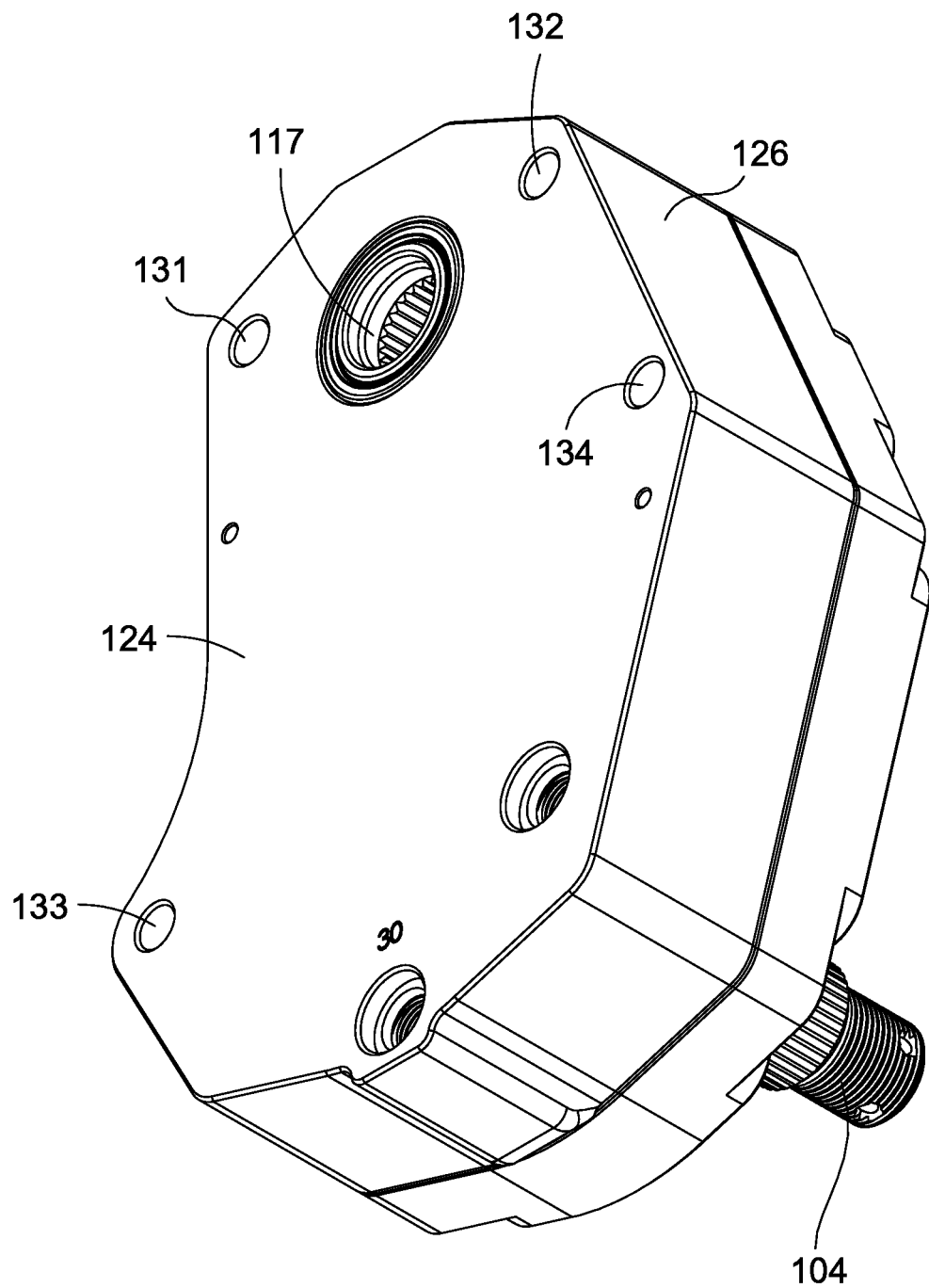
FIG. 10 is a rear perspective view of the portal box portion of the portal box assembly of FIG. 1.

FIG. 10 is a rear perspective view of the portal box portion of the portal box assembly of FIG. 1. Here too, input shaft 103 enters portal box 102 from the rear, and output shaft 104 extends from the front of portal box 102. Holes 131, 132, 133, and 134 for mounting the cover to the body of the portal box, and for mounting the portal box to the mounting plate, are visible in the rear wall of the box. Opening 117 to receive an input shaft is provided.

Figure 11:
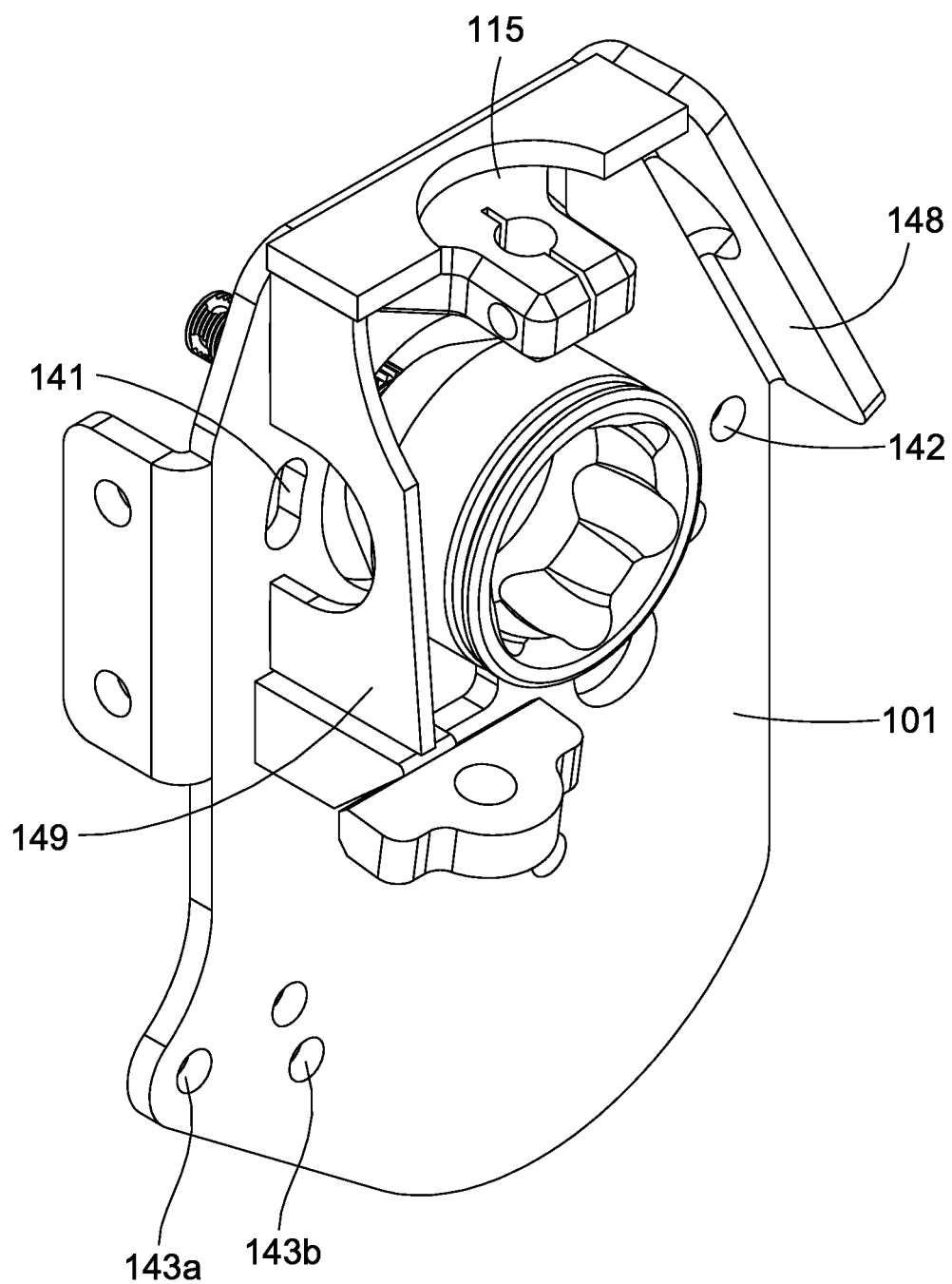
FIG. 11 is a rear perspective view of the mounting plate portion of the portal box assembly of FIG. 1.

FIG. 11 is a rear perspective view of the mounting plate portion of the portal box assembly of FIG. 1. Holes 141, 142, 143a, and 143b for mounting the portal box to the mounting plate are visible in the plate. Mounting hardware 115, 148, and 149 for mounting the assembly to a vehicle is also visible.

Figure 12:
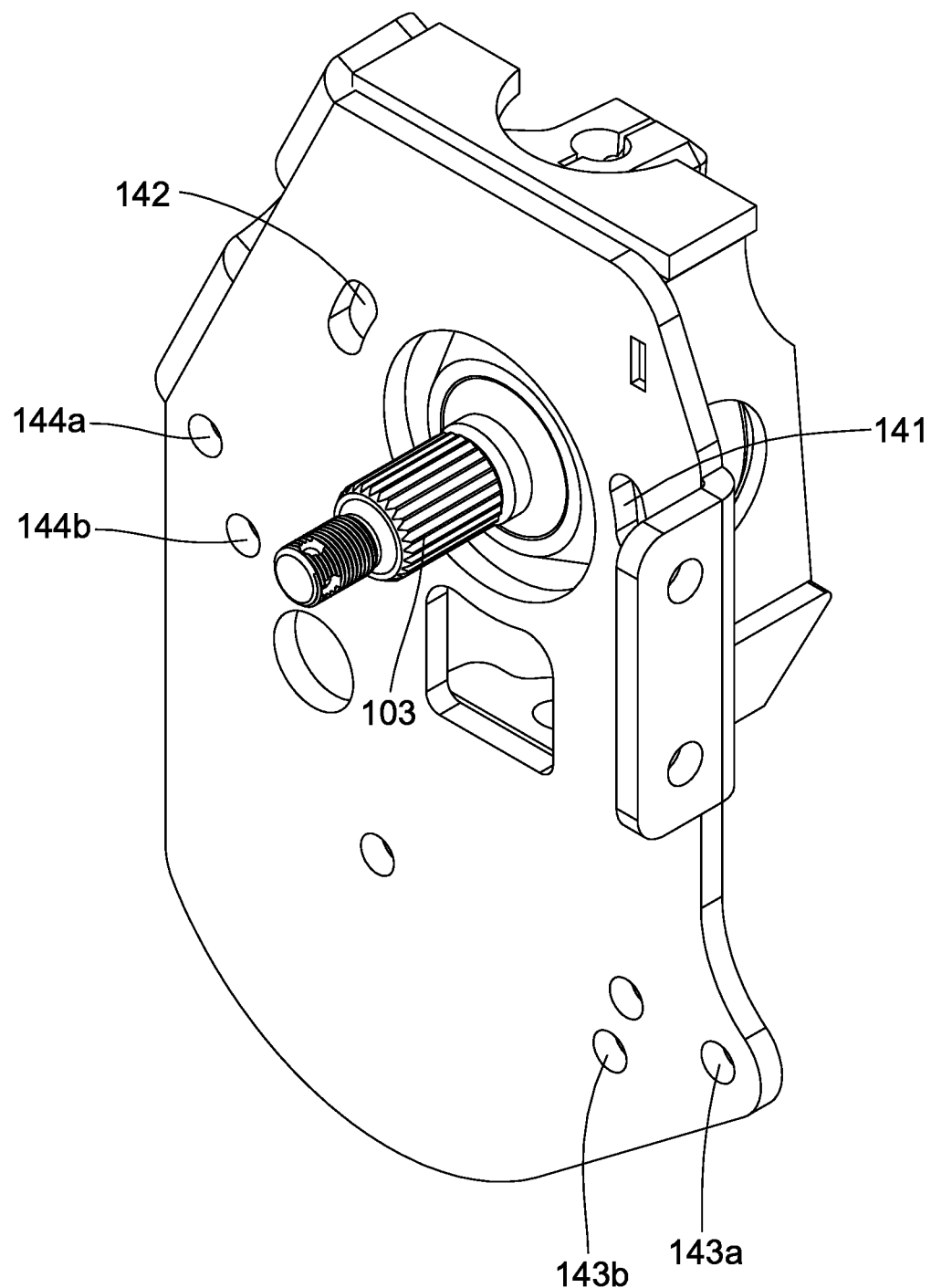
FIG. 12 is a front perspective view of the mounting plate portion of the portal box assembly of FIG. 1.

FIG. 12 is a front perspective view of the mounting plate portion of the portal box assembly of FIG. 1, with input shaft 103 extending through the mounting plate. Holes 141, 142, 143*a*, 143*b*, 144*a*, and 144*b* for mounting the portal box to the mounting plate are visible in the plate. Mounting hardware for mounting the assembly to a vehicle is also visible.

Figure 13:
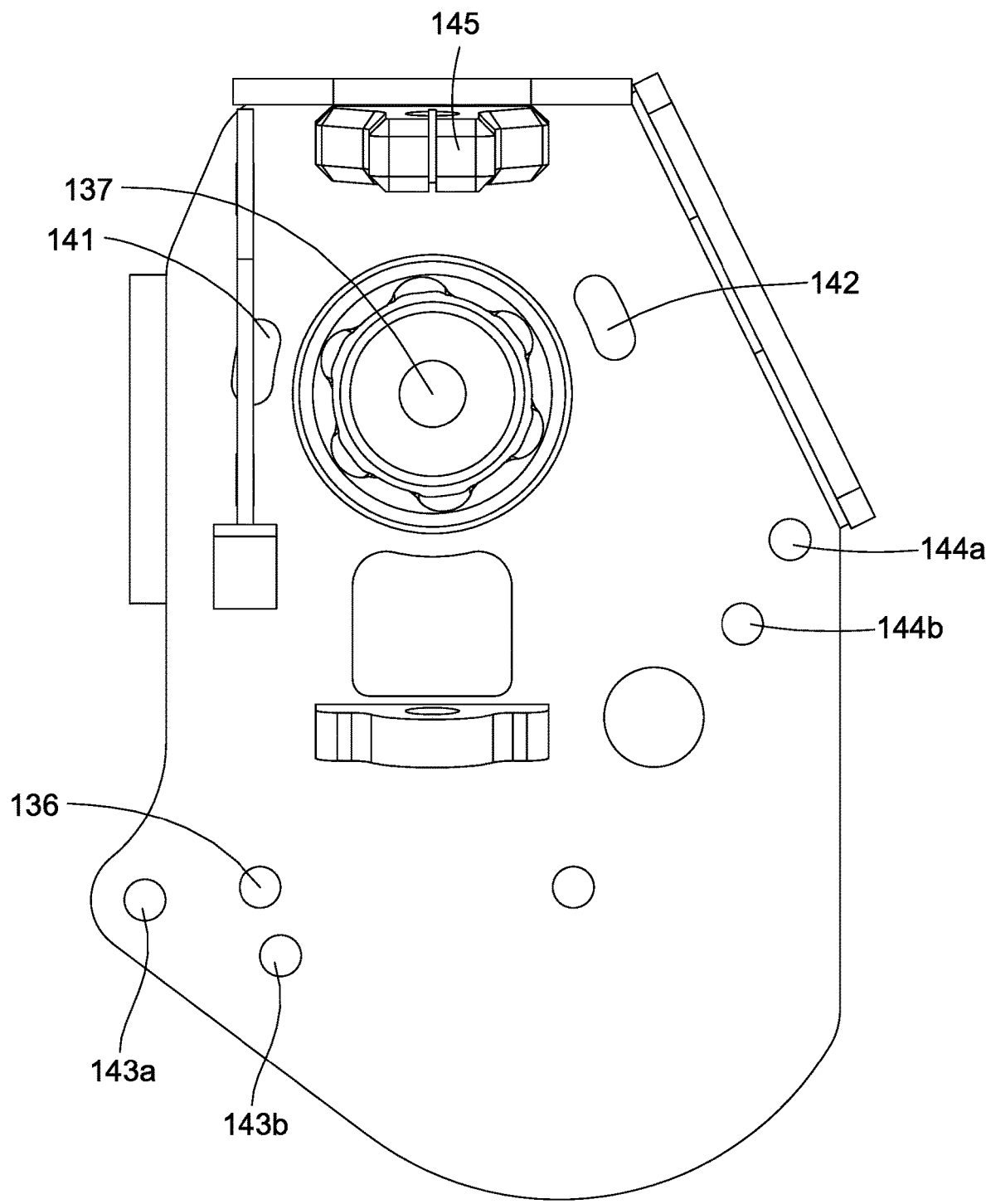
FIG. 13 is a rear elevational perspective view of the mounting plate portion of the portal box assembly of FIG. 1.

FIG. 13 is a rear elevational perspective view of the mounting plate portion of the portal box assembly of FIG. 1. Holes 136, 141, 142, 143*a*, 143*b*, 144*a*, and 144*b* for mounting the cover to the body of the portal box, and/or for mounting the portal box to the mounting plate, are indicated. Input shaft opening 137 is also shown.

Figure 14:
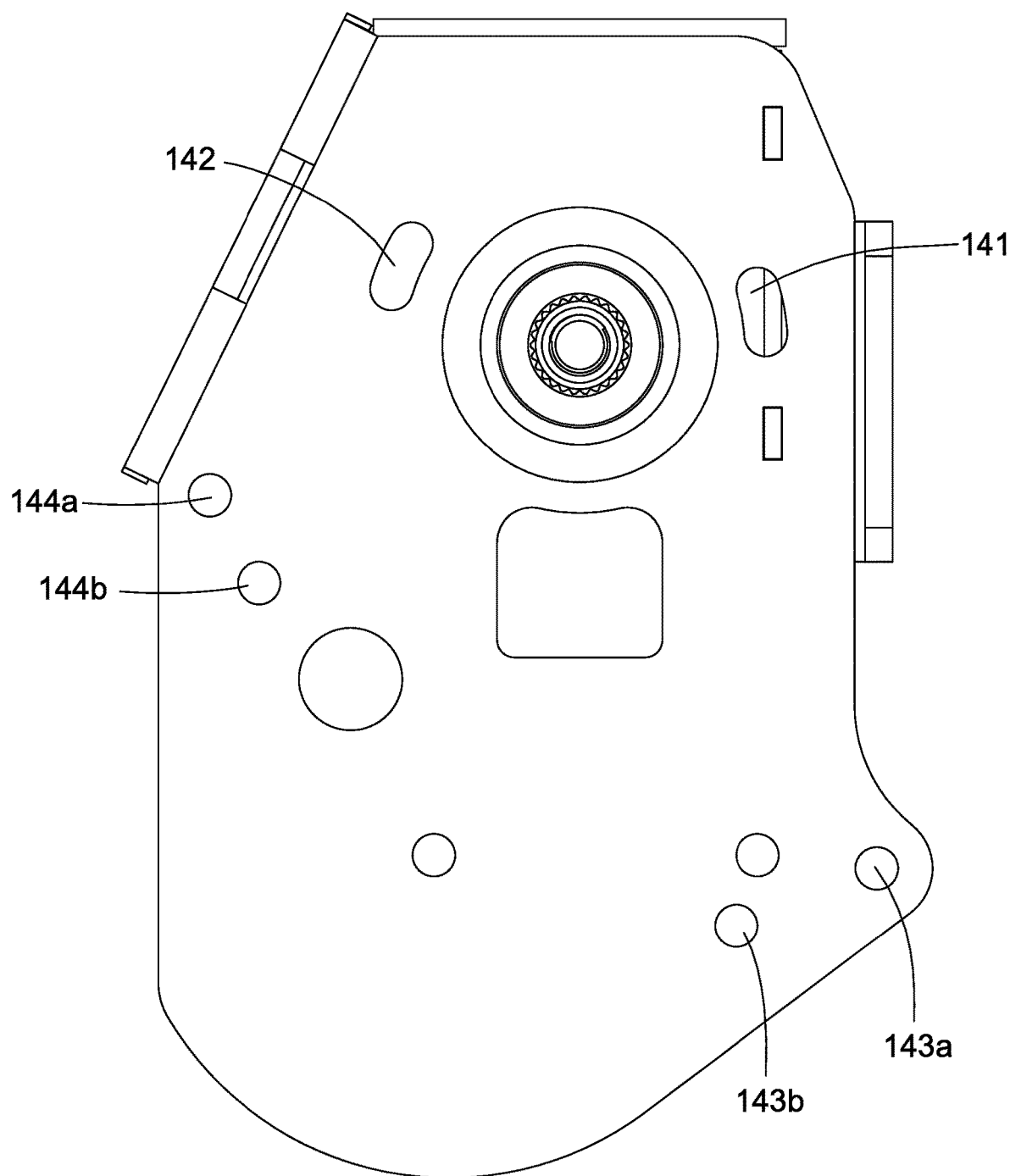
FIG. 14 is a front elevational view of the mounting plate portion of the portal box assembly of FIG. 1.

FIG. 14 is a front elevational view of the mounting plate portion of the portal box assembly of FIG. 1.

Figure 15:
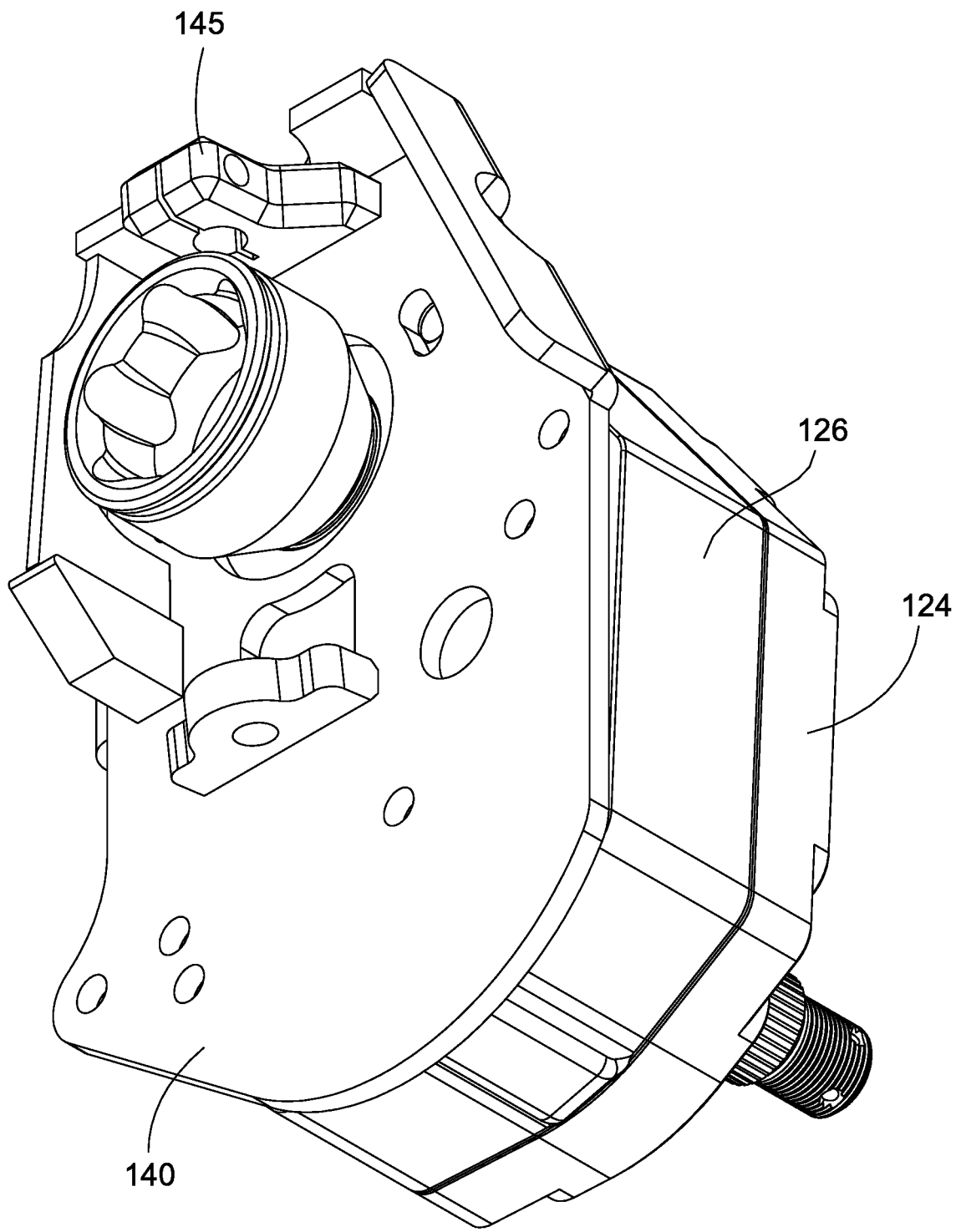
FIG. 15 is a rear perspective view of the portal box assembly of FIG. 1.

FIG. 15 is a rear perspective view of the portal box assembly of FIG. 1. Portal box side wall 126 and portal box cover 124 are indicated, and mounting bracket 145 extends from the top of plate 140.

It is to be appreciated that the inventive assembly is effective for providing increased ground clearance, or lift, increased width, increased wheelbase length, and the low gearing needed for bigger tires.

While the invention has been illustrated and described in detail in the foregoing description and drawings, the same are to be considered as illustrative and not restrictive in character, it being understood that only certain preferred embodiments have been shown and described, and that all changes and modifications that come within the spirit of the invention are desired to be protected.

Additionally, it is to be appreciated that the present invention may comprise or consist essentially of any or all of the described ingredients in their disclosed amounts, and that any or all of the ingredients, amounts, features, elements, and/or embodiments disclosed herein may be combined with any or all of the other ingredients, amounts, features, elements, and/or embodiments disclosed herein to provide an invention that comprises or consists essentially of such ingredients, amounts, features, elements, and/or embodiments.

The grammatical device "and/or" (such as in "A and/or B") is used in this disclosure to mean A alone, or B alone, or both A and B. Additionally, the term "substantially perpendicular" means within 5° of perpendicular, and the term "substantially forward" (or rearward) of perpendicular means at least 10° forward (or rearward) of perpendicular.

The invention claimed is:

1. An adjustable portal box assembly mountable to the suspension of an off road vehicle; the assembly comprising:
    a portal box having an input shaft opening and an output shaft opening;
    an axle of the vehicle extending into the input shaft opening; and
    an output shaft generally centered in and extending from the output shaft opening;
    a set of gears for transferring power from the axle to the output shaft, and for reducing the speed of rotation of the output shaft relative to the speed of rotation of the input shaft, the set of gears comprising an input shaft gear mounted directly or indirectly to the axle, an output shaft gear mounted directly or indirectly to the output shaft, and a linking gear linking the input shaft gear to the output shaft gear;
    wherein the portal box is mountable to the vehicle in either of two positions, namely:
    a first position in which the output shaft is positioned below and forward of the axle when the assembly is used to mount a forward wheel, and in which the output shaft is positioned below and rearward of the axle when the assembly is used to mount a rear wheel, and
    a second position in which the output shaft is positioned below and in vertical alignment with the axle.

2. A portal box assembly for mounting a wheel to an off road vehicle in a lifted and extended wheelbase position, the assembly comprising a mounting plate and a portal box;
    wherein said mounting plate is mountable to the suspension of the off road vehicle;
    wherein said portal box is mountable to said mounting plate;
    wherein said the portal box includes an input shaft opening for an input shaft, and an output shaft opening for an output shaft,
    wherein said the portal box is mountable to the mounting plate only in an extended wheelbase position in which the output shaft is positioned below and forward of said input shaft when the assembly is adapted for mounting a forward wheel, and in which the output shaft is positioned below and rearward of said input shaft when the assembly is adapted for mounting a rearward wheel.

3. The assembly of claim 2 wherein the portal box is additionally mountable to the mounting plate in a second position in which the output shaft is positioned below and in vertical alignment with the input shaft.

4. A portal box assembly for mounting a wheel to an off road vehicle in a lifted and extended wheelbase position, the assembly comprising:
    a) a portal box having an input shaft opening for an input shaft, and an output shaft generally centered in and extending from an output shaft opening;
    b) a set of gears provided in the portal box to transmit power from the input shaft to the output shaft and to reduce the speed of rotation of the output shaft relative to the speed of rotation of the input shaft, wherein the set of gears comprises an input shaft gear mounted directly or indirectly to the axle, an output shaft gear mounted directly or indirectly to the output shaft, and a linking gear linking the input shaft gear to the output shaft gear;
    wherein the portal box is mountable to the vehicle in an extended wheelbase position in which the output shaft is positioned below and forward of the input shaft when the assembly is adapted for mounting a forward wheel, and in which the output shaft is positioned below and rearward of the input shaft when the assembly is adapted for mounting a rearward wheel.

5. A portal box assembly according to claim 4 wherein the assembly is additionally mountable to the mounting plate in a non-extended wheelbase position in which the output shaft is positioned below and in vertical alignment with the input shaft.

* * * * *